United States Patent [19]

Rademachers et al.

[11] Patent Number: 4,985,078
[45] Date of Patent: Jan. 15, 1991

[54] THERMOSTABLE ZINC FERRITE COLOR PIGMENTS CONTAINING 0.05–0.5 WT % LITHIUM, A PROCESS FOR THEIR PREPARATION AND THEIR USE

[75] Inventors: Jakob Rademachers, Krefeld; Volker Wilhelm, Bergisch-Gladbach; Siegfried Keifer; Wilfried Burow, both of Krefeld, all of Fed. Rep. of Germany

[73] Assignee: Bayer Aktiengesellschaft, Leverkusen, Fed. Rep. of Germany

[21] Appl. No.: 357,999

[22] Filed: May 30, 1989

[30] Foreign Application Priority Data

Jun. 9, 1988 [DE] Fed. Rep. of Germany ....... 3819626

[51] Int. Cl.$^5$ .......................... C04B 35/26; C09C 1/04; C09C 1/22; C09C 1/62
[52] U.S. Cl. .................................... 106/419; 106/456; 106/459; 252/62.61; 423/594
[58] Field of Search ....................... 106/419, 456, 459; 423/594; 252/62.61

[56] References Cited

U.S. PATENT DOCUMENTS

| | | | |
|---|---|---|---|
| 2,734,034 | 2/1956 | Crowley | 252/62.61 |
| 3,609,084 | 9/1971 | Loye | 252/62.61 |
| 3,822,210 | 7/1974 | Iwase et al. | 423/594 |
| 4,140,539 | 2/1979 | Hund et al. | 106/459 |
| 4,268,319 | 5/1981 | Muenker et al. | 106/431 |
| 4,289,745 | 9/1981 | Patil | 106/459 |
| 4,292,294 | 9/1981 | Patil et al. | 106/419 |
| 4,443,264 | 4/1984 | Hund et al. | 106/419 |
| 4,681,637 | 7/1987 | Rademachers et al. | 106/425 |

FOREIGN PATENT DOCUMENTS

| | | |
|---|---|---|
| 0074563 | 3/1983 | European Pat. Off. |
| 8391157 | 12/1984 | Japan . |
| 1071611 | 6/1967 | United Kingdom ............ 252/62.61 |

*Primary Examiner*—Josephine Barr
*Assistant Examiner*—John Boyd
*Attorney, Agent, or Firm*—Connolly and Hutz

[57] ABSTRACT

Thermostable pigments for coloring stoving lacquers, coil coat lacquers, plastics, sand granulates, lime sandstone, enamel or ceramic glazes are zinc ferrite color pigments containing from 0.01 to 0.5% by weight of lithium.

4 Claims, No Drawings

# THERMOSTABLE ZINC FERRITE COLOR PIGMENTS CONTAINING 0.05–0.5 WT % LITHIUM, A PROCESS FOR THEIR PREPARATION AND THEIR USE

This invention relates to zinc ferrite color pigments to a process for their preparation and to their use. It relates in particular to zinc ferrite colour pigments with improved themostability.

BACKGROUND OF THE INVENTION

Zinc ferrite crystallizes in the spinel lattice and may be used as starting material for soft magnets or as corrosion protective or color pigment, depending on its stoichiometric composition, the additives contained in it, its particle sizes, its crystal form and its surface properties.

Non-ferrimagnetic color pigments have become known in the English language world as "tan" pigments.

The preparation of zinc ferrite pigments is described in US-A 3 832 455. In the process described there, ferric hydroxide is precipitated from iron-II sulphate solution on zinc oxide or zinc carbonate at pH values from 5 to 6 and temperatures from 49° to 52° C., the resulting suspension is filtered and the solid residue is washed, dried and annealed.

In the process according to US-A 2 904 395, the zinc ferrite pigments are prepared both by mutual precipitation from the corresponding solutions containing iron and zinc, followed by filtration, washing, drying and annealing, and by annealing an intimate mixture of ferric hydroxide and zinc oxide which has been obtained in aqueous suspension. Calcining is carried out at temperatures of up to 1000° C. with the addition of catalysts such as hydrochloric acid or zinc chloride.

It is known from US-A 4 222 790 that the annealing process for the preparation of zinc ferrite or magnesium ferrite may be improved by the addition of an alkali metal silicate to the mixture. Aluminium sulphate is added as flocculating agent to improve filtration.

The addition of compounds forming $Al_2O_3$ and $P_2O_5$ for the calcination of color pure, chloride free zinc ferrite pigments is described in DE-A 3 136 279.

According to EP-B 154 919, color pure zinc ferrite pigments may be obtained without additives by using needle shaped $\alpha$-FeOOH of a certain particle size and surface and zinc oxide of a certain surface.

Boric acid or boron phosphate is added after annealing to improve the cooling process.

Lastly, according to JP-B 570 11 829, titanium dioxide is added to produce heat resistant yellow zinc ferrite color pigments.

The properties of the anisometric zinc ferrites obtained are described in detail in T.C. Patton, Pigment Handbook, Volume 1, Properties and Economics, pages 347 and 348, John Wiley & Sons, New York, 1973.

These anisometric zinc ferrites are generally distinguished by excellent resistance to light and weathering and high thermostability. They are therefore also used instead of the less thermostable mixtures of iron yellow and iron oxide red.

They have also been found useful in particular for colouring sand granulates, lime sandstone, enamels, ceramic glazes, stoving lacquers and plastics.

Although zinc ferrite pigments are prepared at high temperatures, above 700° C., they are subject to varying degrees of color changes in some systems, especially when they are used for coloring organic materials, and therefore in many cases can no longer be regarded as thermostable in these systems. Thus, for example, when these pigments are used for coloring plastics, a noticeable color shift to darker, more dirty colors takes place at temperatures of about 250° C. and upwards so that zinc ferrite pigments are not suitable for coloring these substances. This applies especially to the coloring of plastics which require relatively high processing temperatures, such as polyamides or ABS plastics.

It is an obJect of the present invention to provide zinc ferrite color pigments which do not have the above described disadvantages of the state of the art.

BRIEF DESCRIPTION OF THE INVENTION

It has now been found that this requirement is fulfilled by zinc ferrite color pigments which have a lithium content of from 0.01 to 0.5% by weight, preferably from 0.05 to 0.02% by weight. The present invention relates to these zinc ferrite pigments.

DETAILED DESCRIPTION OF THE INVENTION

It has been discovered that zinc ferrite pigments with a certain amount of lithium contained therein are remarkably thermostable.

The addition of the surprisingly small quantities of lithium of only 0.05 to 0.2% by weight is sufficient to provide the necessary thermostability for coloring plastics at temperatures of up to 300° C. or more so that the pigments may be incorporated in polyamides or ABS plastics. If larger quantities of lithium are present in the zinc ferrite, a marked shift of the pigment color tone to darker brown tones occurs.

The present invention also relates to a process for the preparation of the zinc ferrite color pigments according to the invention.

This process is characterized in that one or more lithium compounds are added in such quantities before or during calcination to a mixture or solution of starting materials containing or giving rise to a starting mixture of zinc oxide and iron oxide corresponding to the composition of the zinc ferrite color pigments that after calcination, the zinc ferrite color pigment contains from 0.01 to 0.5% by weight of lithium, preferably from 0.05 to 0.2% by weight of lithium.

The following are examples of substances which may be used as lithium compounds for the preparation of the thermostable zinc ferrite color pigments according to the invention: lithium carbonate, lithium fluoride, lithium chloride, lithium oxide, lithium hydroxide, lithium sulphate, lithium nitrate, lithium phosphate, lithium silicate, lithium titanate, lithium zirconate, lithium ferrite, lithium zincate, lithium borate, lithium aluminate, lithium stannate and lithium aluminium silicate.

For practical reasons, lithium carbonate is used for dry mixtures while difficult soluble compounds such as lithium titanate, lithium borate, lithium phosphate or lithium aluminium silicate are used for suspensions which are yet to be filtered. A desirable increase in brightness is frequently obtained when lithium titanate is used. Naturally occurring minerals containing lithium, such as spodumene, lepidolite or triphylite may also be used. Organic lithium compounds such as lithium stearate, lithium citrate or lithium benzoate may also be added.

The test for thermostability is carried out according to DIN 53 772 of August 1982 by pigmenting thermoplastic resins with 1% of pigment and determining the color deviation of the samples resulting from an increase in the temperature at which the pigment is incorporated, compared with the lowest possible test temperature. In contrast to the DIN regulations, however, the limit of color difference tolerated was 5 $\Delta E^*$ units instead of 3 $\Delta E^*$ units because the main change occurs in the color saturation $\Delta C^*$.

The advantage of the process according to the invention may also be seen in the fact that the small addition of lithium compounds enables the annealing temperature to be lowered by 50°–100° C.

The present invention further relates to the use of zinc ferrite color pigments according to the invention for coloring stoving or coil coat laquers, plastics, sand granulates, lime standstone, enamels and ceramic glazes.

The invention will now be described in more detail with the aid of the following examples which should not, however, limit the scope of the invention.

EXAMPLE 1

671.5 kg of a homogenised aqueous suspension containing 50 kg of goethite (corresponding to 44 kg of $Fe_2O_3$) and 21.5 kg of zinc oxide (containing 99.6% by weight of ZnO) are filtered, 176 g of lithium carbonate are added to the filter cake containing about 32% by weight of dry solids, and the lithium carbonate and filter cake are intimately mixed in a mixing screw and annealed for about 30 minutes at 850° C. After cooling, the clinker, containing 0.05% by weight of lithium, is ground. A bright, luminous yellow brown pigment is obtained which is similar in color to a zinc ferrite pigment which has been annealed at 900° C. without the addition of lithium.

When the resulting pigment was tested for heat resistance in PE-HD according to DIN 53 772, it was found that after a pigmentation of 1% by weight and processing in a double shaft extruder and in the "Arburg" injection moulding apparatus, color differences according to DIN 6174 of 2.8 $\Delta E^*$ units were found between samples which had been prepared at 260° C. and reference samples which had been prepared at the lowest possible test temperature (=200° C.). Color differences of 5.0 $\Delta E^*$ units were found when processing temperatures of 300° C. were employed.

Without the addition of lithium, color differences of $\Delta E^*$ units of 6.8 were found when the pigments were incorporated at 260° C. and 9.4 units at 300° C.

EXAMPLE 2

When 352 g of lithium carbonate were added under otherwise the same procedure as in Example 1, a yellow brown zinc ferrite color pigment having a lithium content of 0.1% by weight Li was obtained. The color differences found in PE-HD were 1.7 $\Delta E^*$ units at 260° C. and 3.8 $\Delta E^*$ units at 300° C., based on sample platelets which had been injection moulded at 200° C.

When the pigment was used for coloring ABS plastic, the injection moulded sample Produced at 280° C. was compared coloristically with the reference sample produced at 220° C. A color difference $\Delta E^*$ of only 1.1 units was found.

EXAMPLE 3

330 g of lithium titanate are added to the suspension containing goethite and zinc oxide from Example 1 and the components are intimately stirred together. After filtration, annealing and grinding, a bright zinc ferrite color pigment containing 0.06% by weight of lithium is obtained. In the thermostability test in PE-HD, the coler difference is found to be 2.1 $\Delta E^*$ units at 260° C. and 3.9 $\Delta E^*$ units at 300° C., compared with the reference sample produced at 200° C.

EXAMPLE 4

The procedure was the same as that employed in Example 3 except that 365 g of lithium phosphate (corresponding to 0.1% by weight of Li) were added instead of lithium titanate. The color differences were 2.0 $\Delta E^*$ units at 260° C. and 4.1 $\Delta E^*$ units at 300° C.

EXAMPLE 5

In this example, 600 g of lithium borate (corresponding to 0.1% by weight of Li) are added to the suspension. When 1% of color pigment was incorporated, the pigment showed a color difference in the thermostability test in PE-HD of 2.1 $\Delta E^*$ units at 260° C. and 4.4 $\Delta E^*$ units at 300° C.

What is claimed is:

1. Zinc ferrite color pigments containing from 0.05 to 0.5% by weight of lithium.

2. Zinc ferrite color pigments according to claim 1 wherein the lithium content is from 0.05 to 0.2% by weight.

3. Process for the preparation of zinc ferrite color pigments according to claim 1 which comprises adding one or more lithium compounds to a mixture of raw materials containing a starting mixture of zinc oxide and iron oxide that form zinc ferrite color pigments after calcination, said addition being before or during calcination, and calcining the mixture to produce the zinc ferrite color pigment containing from 0.01 to 0.5% by weight of lithium.

4. In an improved stoving lacquer, coil coat lacquer, plastic, sand granulates, lime sandstone, enamel or ceramic glaze, each colored with an admixed coloring pigment, the improvement comprises said pigment being the zinc ferrite pigment containing lithium according to claim 1.

* * * * *